United States Patent
St. Clair et al.

(10) Patent No.: US 11,270,474 B2
(45) Date of Patent: Mar. 8, 2022

(54) SCREEN-TONE LOOK GENERATOR

(71) Applicants: Sony Corporation, Tokyo (JP); Sony Pictures Entertainment Inc., Culver City, CA (US)

(72) Inventors: Bret St. Clair, Culver City, CA (US); Marco Recuay, Culver City, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 0 days.

(21) Appl. No.: 16/655,008

(22) Filed: Oct. 16, 2019

(65) Prior Publication Data
US 2020/0184689 A1 Jun. 11, 2020

Related U.S. Application Data
(60) Provisional application No. 62/775,842, filed on Dec. 5, 2018.

(51) Int. Cl.
*G06T 11/00* (2006.01)
(52) U.S. Cl.
CPC .................. *G06T 11/001* (2013.01)

(58) Field of Classification Search
CPC ........ G06T 11/001; G06T 11/60; H04N 5/222
See application file for complete search history.

(56) References Cited

U.S. PATENT DOCUMENTS

| | | | |
|---|---|---|---|
| 8,429,523 B2 | 4/2013 | Tobita | |
| 9,041,717 B2 | 5/2015 | Kaschalk et al. | |
| 2002/0118209 A1* | 8/2002 | Hylen | G03B 1/48 345/582 |
| 2002/0190925 A1* | 12/2002 | Awamoto | G09G 3/2051 345/60 |
| 2015/0277548 A1* | 10/2015 | Imai | G06F 3/0304 345/660 |
| 2016/0307602 A1* | 10/2016 | Mertens | G11B 27/031 |
| 2017/0230647 A1* | 8/2017 | Han | H04N 13/305 |

* cited by examiner

*Primary Examiner* — Samantha (Yuehan) Wang
(74) *Attorney, Agent, or Firm* — Procopio, Cory, Hargreaves & Savitch, LLP

(57) ABSTRACT

Generating a screen-tone look image for a video, including: receiving a smooth gradation rendered image and position information of pixels in the rendered image; generating a pattern for each pixel of the pixels in the rendered image using the position information; dividing the rendered image into a fixed number of sections defined by luminance to produce a luminance gradient image; and applying the patterns to the fixed number of sections of the luminance gradient image.

20 Claims, 7 Drawing Sheets

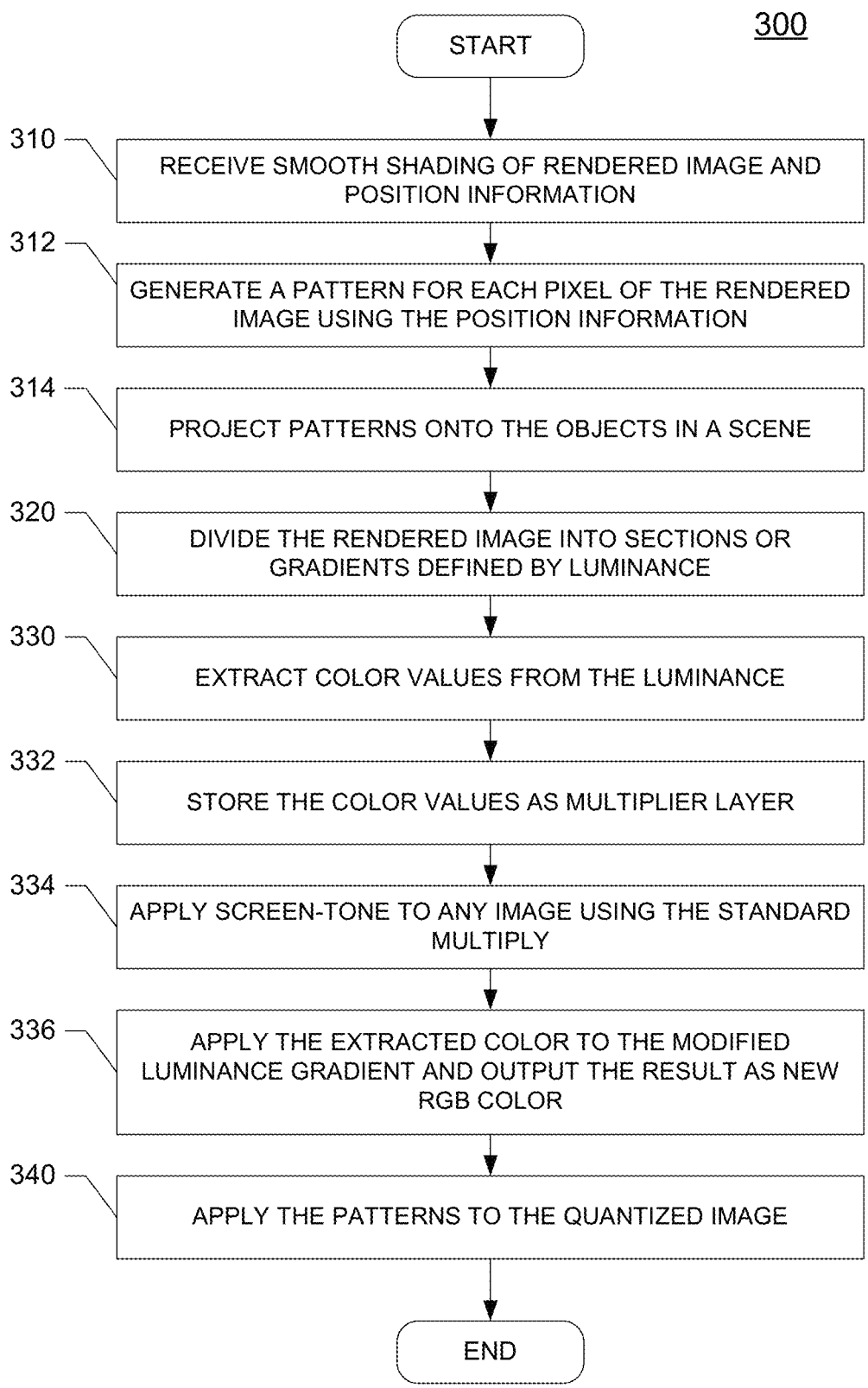

SCREEN-TONE LOOK GENERATOR

CROSS-REFERENCE TO RELATED APPLICATIONS

This application claims the benefits of priority under 35 U.S.C. § 119(e) of U.S. Provisional Patent Application No. 62/775,842, filed Dec. 5, 2018, entitled "Thresher and Hatcher tools: The Creation of a Screentone Look". The disclosure of the above-referenced application is incorporated herein by reference.

BACKGROUND

Field

The present disclosure relates to CG animated movies, and more specifically, to generating a "comic-book" look for the CG animated movies.

Background

The basic principles of the "look of picture" for computer graphics (CG) animated movies generally include: (1) rendering smooth gradations for the shading; (2) mimicking real world surface properties for the materials; and (3) emulating physical details seen in real life for the textures. However, these principles need to be reworked to bring a "comic-book" look to life in the CG animated movies.

SUMMARY

The present disclosure provides for generating a screen-tone look for CG animated movies which includes quantizing the smooth shading of the render received from renderer and integrating the halftone dots and hatched lines to the rendered image.

In one implementation, a method for generating a screen-tone look image for a video is disclosed. The method includes: receiving a smooth gradation rendered image and position information of pixels in the rendered image; generating a pattern for each pixel of the pixels in the rendered image using the position information; dividing the rendered image into a fixed number of sections defined by luminance to produce a luminance gradient image; and applying the patterns to the fixed number of sections of the luminance gradient image.

In one implementation, the fixed number of sections includes a series of successive bands, wherein each band is manipulated individually. In one implementation, the method further includes providing interactive control over position, width, transition width, transition pattern, and final color correction. In one implementation, generating a pattern includes generating patterns that simulate printed artifacts such including dots, lines, and grid patterns. In one implementation, the method further includes adjusting position, orientation, and frequency of the patterns. In one implementation, the method further includes projecting the patterns onto objects in a scene of the video. In one implementation, the method further includes editing a look of each pattern of the patterns once the patterns are positioned. In one implementation, the method further includes extracting color from the luminance. In one implementation, the method further includes: applying the extracted color to the luminance gradient image; and outputting the luminance gradient image as a new color. In one implementation, the patterns to the fixed number of sections includes applying dots in sections that are relatively bright and applying lines in sections that are relatively shadowy.

In another implementation, a screen-tone look generating system is disclosed. The system includes: a hatcher to receive a smooth gradation rendered image along with position information of each pixel from a renderer, the hatcher configured to use the position information to generate patterns for the rendered image; and a thresher to divide the rendered image into a fixed number of sections defined by luminance to produce a luminance gradient image, the thresher configured to apply the patterns to the fixed number of sections of the luminance gradient image.

In one implementation, the patterns simulate printed artifacts. In one implementation, the patterns comprise dots, lines, and grids. In one implementation, the fixed number of sections comprises a series of successive bands.

In one implementation, the system further includes a projector configured to project the patterns onto objects in a scene of the video. In one implementation, the system further includes an extractor configured to extract color from the luminance. In one implementation, the system further includes an applicator configured to apply the extracted color to the luminance gradient image, and output the luminance gradient image as a new color.

In another implementation, an apparatus for generating a screen-tone look image for a video is disclosed. The apparatus includes: means for receiving a smooth gradation rendered image and position information of pixels in the rendered image; means for generating a pattern for each pixel of the pixels in the rendered image using the position information; means for dividing the rendered image into a fixed number of sections defined by luminance to produce a luminance gradient image; and means for applying the patterns to the fixed number of sections of the luminance gradient image.

In one implementation, the apparatus further includes means for projecting the patterns onto objects in a scene of the video. In one implementation, the apparatus further includes means for applying the extracted color to the luminance gradient image, and outputting the luminance gradient image as a new color.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which:

FIG. 3 is a flow diagram of a process for generating a screen-tone look image in accordance with one implementation of the present disclosure;

DETAILED DESCRIPTION

Figure 1:
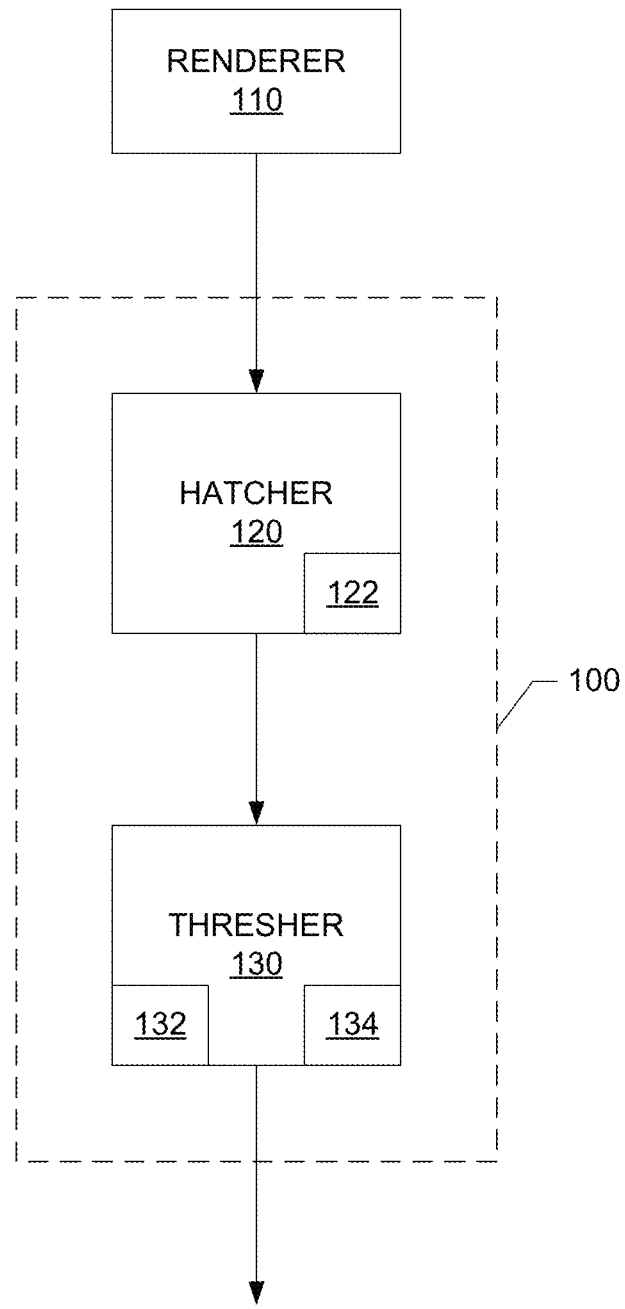
FIG. 1 is a block diagram of a screen-tone look generator in accordance with one implementation of the present disclosure.

Certain implementations of the present disclosure provide for generating a "screen-tone" look for CG animated movies which includes quantizing the smooth shading of the render received from renderer (e.g., ray tracer) and integrating the halftone dots and hatched lines to the render. After reading these descriptions, it will become apparent how to implement the disclosure in various implementations and applications. Although various implementations of the present disclosure will be described herein, it is understood that these implementations are presented by way of example only, and not limitation. As such, this detailed description of various implementations should not be construed to limit the scope or breadth of the present disclosure.

As described above, the basic principles of the "look-of-picture" for the CG animated movies need to be reworked to bring the "comic-book" look to life by generating the screen-tone look. One of the issues includes restructuring lighting and rendering models to mimic the printed and hand-drawn artwork. Other issues with the basic principles of the look-of-picture for the CG animated movies include a pattern projection issue, a pattern gradient issue, a printing technique issue, and a quantization issue.

Regarding the pattern projection issue, although the hatching patterns sometimes provide an indication of a 3-D form, the screen-tone and the hatch patterns on printed pages typically exist in the space of the image and do not need to move or exist in a real 3-D space. However, since the images are not static (i.e., the objects and the cameras move), a host of problems, which the printing techniques are able to ignore, needs to be addressed. For example, one problem that needs to be addressed includes the disposition of a dot pattern when the dot pattern is simply projected into a scene and a character in the scene turns. The question becomes should the character swim through the pattern, should the pattern stick to the character but potentially stretch, or should additional patterns be filled in. Other problems that needed to be addressed include how to respond to the extreme camera moves and how to handle stereoscopic output with slightly offset views of the same object.

Regarding the pattern gradient issues, the screen-tones could not simply be dots that were either on or off. That is, the position of every pixel needs to be known with respect to each tonal gradient in order to simulate printing.

Regarding the printing technique issue, the thickness of any dot or line in a printed pattern typically reflects the brightness of that region along a single tonal range. However, when the motion is introduced, the patterns can be distracting, especially when patterns move across important features such as eyes. Thus, there is a need for a way to reproduce the feel of the screen printing over complex moving surfaces while specifically protecting for the features that might be anywhere within the value gradient. The solution also needs to be flexible and interactive.

Regarding the quantization issue, there is a need for the simplification of smooth gradations to be matched into the regions of uniform values.

Accordingly, to address the above-stated issues, rules derived from studying the comic book art and the concept paintings are incorporated into the applications. In one implementation, the present disclosure provides hatcher and thresher applications to quantize the smooth shading of the ray tracer and to integrate the halftone dots and hatched lines (collectively referred to as "screen-tones") to the rendered image. Since the hatcher and thresher applications can be used on every frame of a CG animated movie, the applications also need to be fast and robust enough to address the needs of the entire movie.

FIG. 1 is a block diagram of a screen-tone look generator 100 in accordance with one implementation of the present disclosure. In the illustrated implementation of FIG. 1, the screen-tone look generator 100 includes a hatcher 120 and a thresher 130.

In one implementation, the renderer 110 (e.g., ray tracer) generates smooth shading of rendering models and sends a rendered image along with position information each pixel of the rendered image to the screen-tone look generator 100. The hatcher 120 uses the position information from the renderer 110 to generate a pattern for each pixel of the rendered image. For example, the hatcher 120 generates dots that run along the edges of a character such that the dots get larger as the character comes closer to the camera and the dots get smaller as the character moves away from the camera.

In one implementation, the hatcher 120 generates patterns that simulate the printed artifacts. For example, the hatcher 120 generates the screen-tone dots, lines, and grid patterns from the rendering models (for both 2-D and 3-D implementations). The hatcher 120 includes a projector 122 which then uses the position (P) of a point, the reference position ($P_{ref}$), the surface normal (N) at the point, and the UV global variables of the rendering models to project the patterns onto the objects in a scene.

In one implementation, the hatcher 120 also uses object space and bounding box center. A projection mode is selected to be one of: (1) the UV space; (2) the screen space; (3) the single axis; or (4) the tri-planar. The projection transformations are then modified to adjust the position, the orientation, and the frequency of the pattern to the needs of a given shot. For cases in which a tri-planar projection would not work for every axis (e.g., when a camera is very wide or object shape or foreshortening resulted in unwanted compression or stretching), controls are provided to adjust the transforms per axis. If object space or bounding box centers are included, projections are locked such that the patterns track to the position of the geometry and pattern scale is normalized as needed.

In another implementation, the hatcher 120 also uses the axis input of the hatcher node to attach an animated axis to match the translation and rotation of the object. Thus, in this implementation, once the patterns are positioned, the artists can edit the look of each pattern. That is, the artists are given control over scale, orientation, spacing, and hardness. The 3-D implementation of the tool also provided an optional bifurcation mode which uses derivatives to normalize the pattern scale (i.e., if the patterns became too large, then the lines or dots are split).

In one implementation, the thresher 130 divides the rendered image into a fixed number of sections (or gradients) defined by luminance. That is, the thresher 130 divides the luminance gradient into a series of successive bands that can be manipulated individually. Thus, the thresher 130 provides fast global control over: the range of the gradient to be subdivided; and the end conditions (i.e., the disposition of the values outside the range). For each resulting band, the thresher 130 provides interactive control over position and width of the luminance bands, the width of the transition between bands, the pattern to be applied across each transition, and final color correction. This allows the users to quickly position the patterns (by positioning the bands with the associated patterns) and limit the patterns to the value regions, where the patterns are least distracting or most useful.

In another implementation, the thresher 130 includes an applicator 134 which applies the newly-generated gradient to the luminance extracted color of the second image, and outputs the result as the new RGB color. The thresher 130 also includes an extractor 132 which works by extracting color from the luminance. The luminance is remapped based on its value relative to the incoming screen-tone gradient channel at the given pixel. These values are then stored as a "multiplier" layer, which is a new gradient with values that are either above one or below one depending on whether the pixel needs to be darkened or brightened. Once the luminance is converted, the screen-tones can be applied to any image using a standard multiply. Thus, in another implementation, the newly-generated gradient can be used elsewhere in the graph to apply the screen-tone distribution as defined upstream, regardless of the luminance at the new location. In another implementation, to achieve the anime look, the thresher 130 can be used, but a uniform grey value can be substituted for the screen-tone. This may force each band of the gradient to step at the same value, thereby simplifying the screen-tone gradients into simple contours.

In one implementation, the thresher 130 also receives the patterns generated by the hatcher 120 and applies the patterns to the quantized sections. For example, if the thresher 130 is set to quantize the image into four luminance sections, the thresher 130 could be set to apply dots to the two brightest section, and hatch lines to the two darker sections. Thus, in this implementation, thresher 130 divides the rendered image into sections (or gradients) defined by luminance and integrates the selected patterns onto the edges of the defined sections.

Figure 2A:
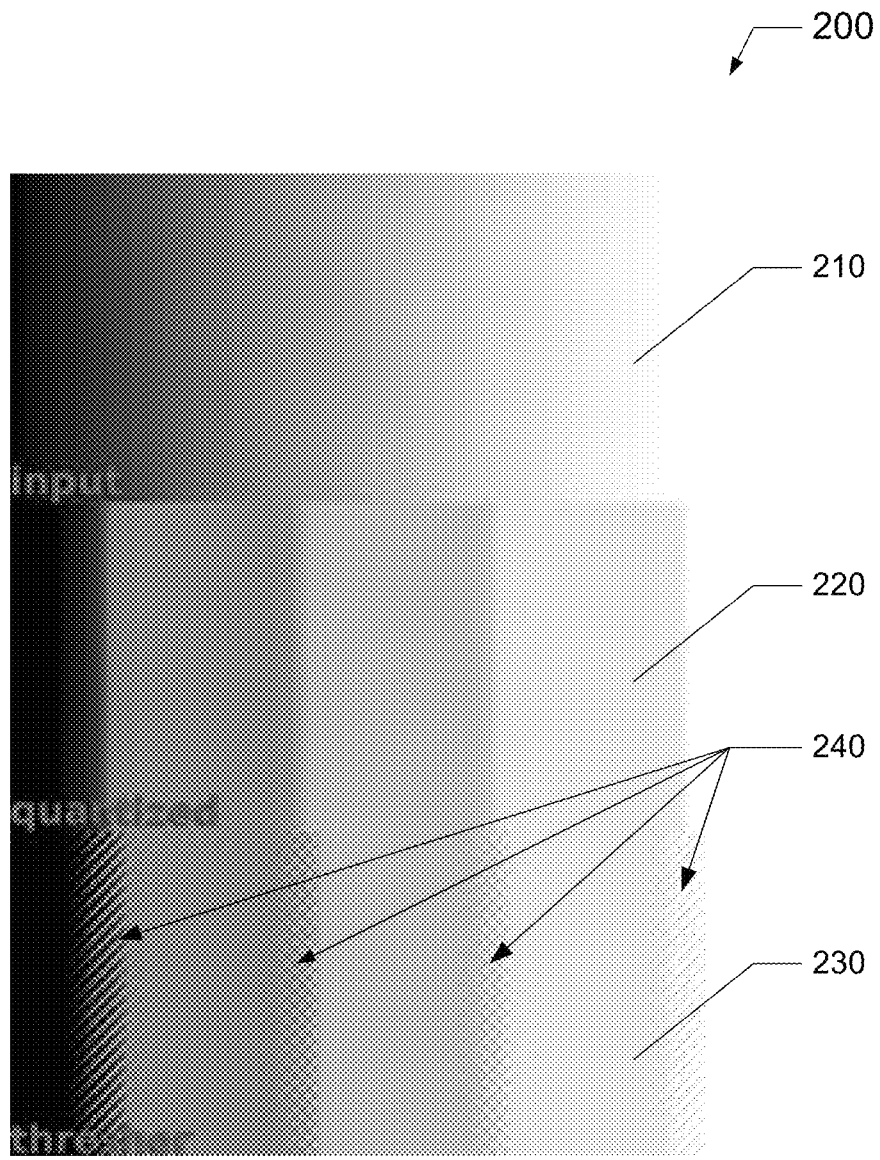
FIG. 2A is an example progression in generating a screen-tone image in accordance with one implementation of the present disclosure.

FIG. 2A is an example progression 200 in generating a screen-tone image in accordance with one implementation of the present disclosure. In the illustrated implementation of FIG. 2A, a smooth gradient image 210 is processed into a "screen-tone" image 230 by quantizing the smooth gradient image 210 into a quantized image 220 and integrating the patterns 240 generated by the hatcher 120 in the transitions between gradient bands.

Figure 2B:
FIG. 2B, FIG. 2C, and FIG. 2D show the result of applying the screen-tone look generator on a smooth gradient image in accordance with one implementation of the present disclosure.
Figure 2C:
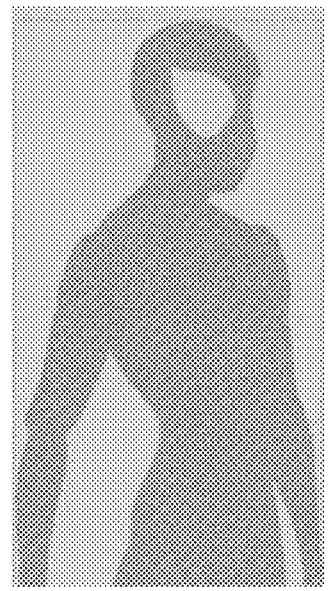
Figure 2D:

FIG. 2B, FIG. 2C, and FIG. 2D show the result of applying the screen-tone look generator on a smooth gradient image in accordance with one implementation of the present disclosure. FIG. 2B is an example of the smooth gradient image. FIG. 2C is an example of the image with patterns. FIG. 2D is an example of the screen-tone image.

Figure 2E:
FIG. 2E, FIG. 2F, FIG. 2G, FIG. 2H, and FIG. 2J show the result of applying the screen-tone look generator on a smooth gradient image in accordance with another implementation of the present disclosure.
Figure 2F:
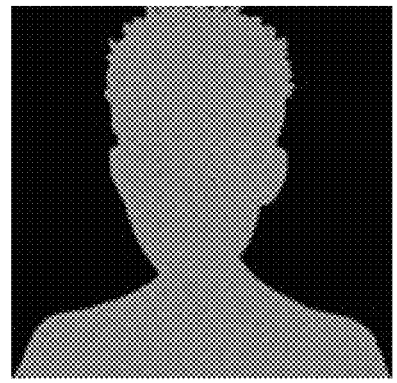
Figure 2G:
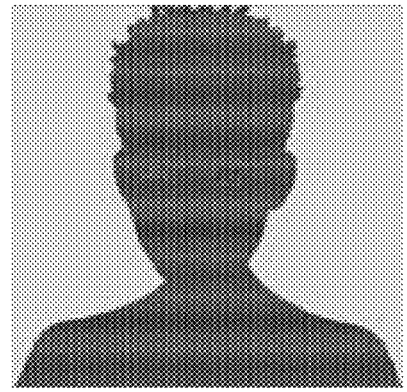
Figure 2H:
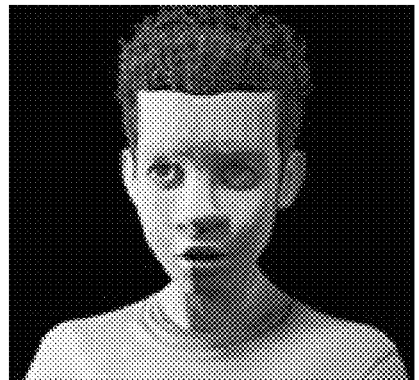
Figure 2J:
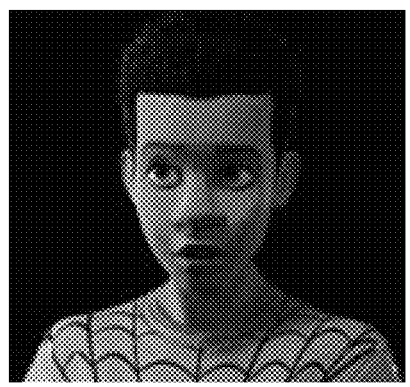

FIG. 2E, FIG. 2F, FIG. 2G, FIG. 2H, and FIG. 2J show the result of applying the screen-tone look generator on a smooth gradient image in accordance with another implementation of the present disclosure. FIG. 2E is an example of the smooth gradient image. FIG. 2F and FIG. 2G are examples of the patterns resulting from applying the hatcher process to FIG. 2E. FIG. 2H is an example of the patterns applied to a grayscale luminance gradient of FIG. 2E via the thresher process. FIG. 2J is an example of the final screen-tone image resulting from applying the thresher processed luminance FIG. 2E to the input smooth gradient image FIG. 2E.

FIG. 3 is a flow diagram of a process 300 for generating a screen-tone look image in accordance with one implementation of the present disclosure. In one implementation, the method 300 is implemented as an application, which may be divided into a hatcher application and a thresher application.

In one implementation, the hatcher application receives, block 310, the smooth shading of the rendered image along with position information from a renderer. The hatcher application generates, at block 312, a pattern for each pixel of the rendered image using the position information. For example, the hatcher application generates dots that run along the edges of a character such that the dots get larger as the character comes closer to the camera and the dots get smaller as the character moves away from the camera. The hatcher application generates patterns that simulate the printed artifacts such as screen-tone dots, lines, and grid patterns. The hatcher application projects the patterns onto the objects in a scene, at block 314, using the position (P) of a point, the reference position ($P_{ref}$), the surface normal (N) at the point, and the UV global variables of the rendered image.

In one implementation, the hatcher application also uses object space and bounding box center. A projection mode is selected to be one of: (1) the UV space; (2) the screen space; (3) the single axis; or (4) the tri-planar. The projection transformations are then modified to adjust the position, the orientation, and the frequency of the pattern to the needs of a given shot. For cases in which a tri-planar projection would not work for every axis (e.g., when a camera is very wide or object shape or foreshortening resulted in unwanted compression or stretching), controls are provided to adjust the transforms per axis. If object space or bounding box centers are included, projections are locked such that the patterns track to the position of the geometry and pattern scale is normalized as needed.

In another implementation, the hatcher application also uses the axis input of the hatcher node to attach an animated axis to match the translation and rotation of the object. Thus, in this implementation, once the patterns are positioned, the artists can edit the look of each pattern. That is, the artists are given control over scale, orientation, spacing, and hardness. The 3-D implementation of the tool also provided an optional bifurcation mode which uses derivatives to normalize the pattern scale (i.e., if the patterns became too large, then the lines or dots are split).

In one implementation, the thresher application divides the rendered image into sections (or gradients) defined by luminance, at block 320. That is, the thresher application divides the luminance gradient into a series of successive bands that can be manipulated individually. Thus, the thresher application provides fast global control over: the range of the gradient to be subdivided; and the end conditions (i.e., the disposition of the values outside the range). For each resulting band, the thresher application provides interactive control over position and width of the luminance bands, the width of the transition between bands, the pattern to be applied across each transition, and final color correction. This allows the users to quickly position the patterns (by positioning the bands with the associated patterns) and limit the patterns to the value regions, where the patterns are least distracting or most useful.

In another implementation, the thresher application extracts, at block 330, color from the luminance, which is remapped based on its value relative to the incoming screen-tone gradient channel at the given pixel. These values are then stored as a "multiplier" layer, at block 332, which is a new gradient with values that are either above one or below one depending on whether the pixel needs to be darkened or brightened. Once the luminance is converted, the screen-tones are applied, at block 334, to any image using a standard multiply. Thus, in another implementation, the newly-generated gradient can be used elsewhere in the graph to apply the screen-tone distribution as defined upstream, regardless of the luminance at the new location. The thresher application then applies the extracted color, at block 336, to the modified luminance gradient and outputs the result as the new RGB color. In another implementation, to achieve the anime look, the thresher application can be used, but a uniform grey value can be substituted for the screen-tone. This may force each band of the gradient to step at the same value, thereby simplifying the screen-tone gradients into simple contours.

In one implementation, the thresher application receives the patterns generated by the hatcher application and applies the patterns to the quantized or sectioned image, at block 340. For example, in sections that are relatively bright, the thresher application applies dots, whereas in sections that are relatively dark or shadowy, the thresher application applies lines. Thus, in this implementation, thresher application divides the rendered image into sections (or gradients) defined by luminance and integrates the selected patterns onto the edges of the defined sections.

Figure 4A:
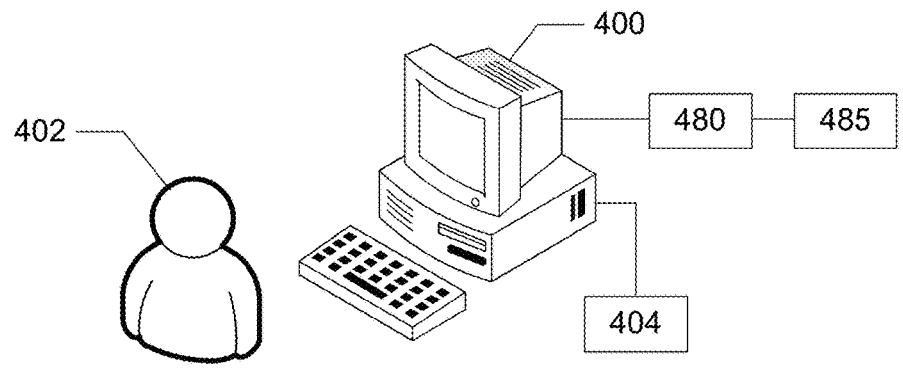
FIG. 4A is a representation of a computer system and a user in accordance with an implementation of the present disclosure.

FIG. 4A is a representation of a computer system 400 and a user 402 in accordance with an implementation of the present disclosure. The user 402 uses the computer system 400 to implement a screen-tone look application 490 as illustrated and described with respect to the screen-tone look generator 100 of the block diagram shown in FIG. 1 and the process 300 illustrated in FIG. 3.

Figure 4B:
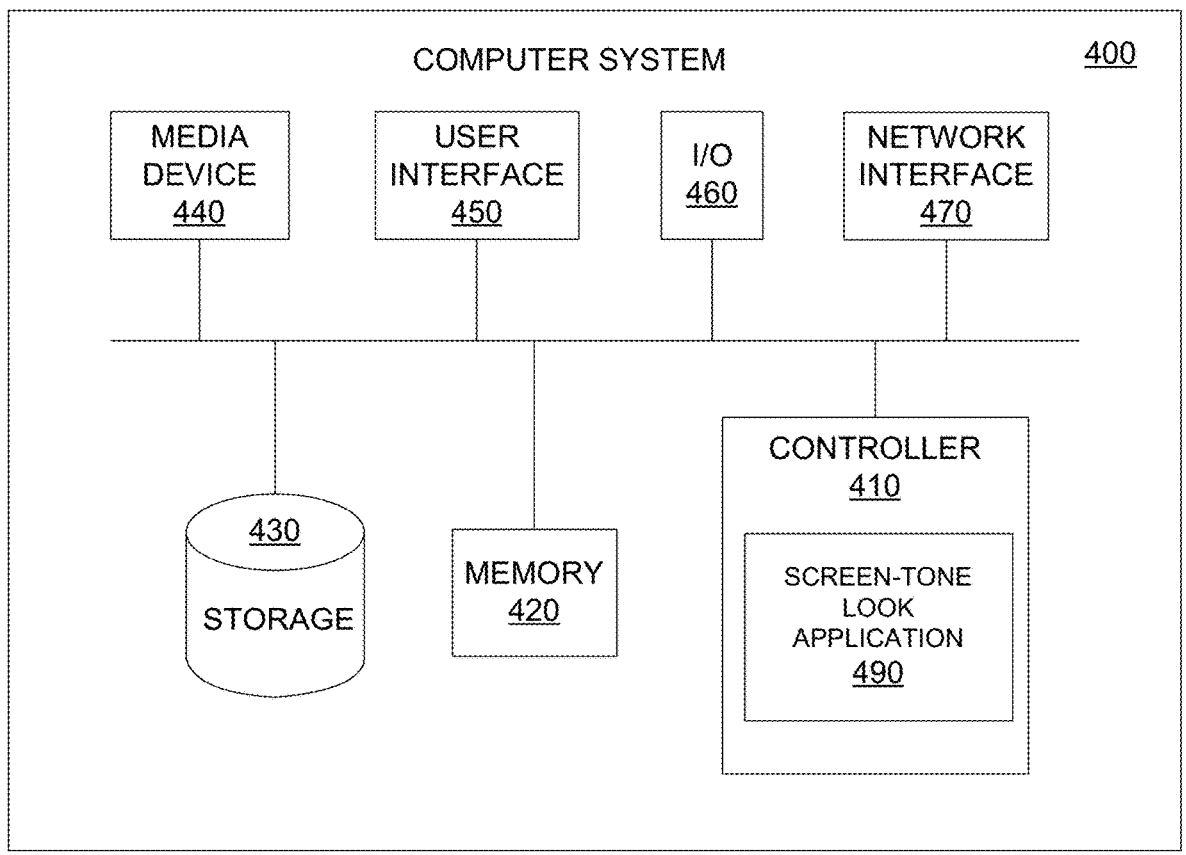
FIG. 4B is a functional block diagram illustrating the computer system hosting the screen-tone look application in accordance with an implementation of the present disclosure.

The computer system 400 stores and executes the screen-tone look application 490 of FIG. 4B. In addition, the computer system 400 may be in communication with a software program 404. Software program 404 may include the software code for the screen-tone look application. Software program 404 may be loaded on an external medium such as a CD, DVD, or a storage drive, as will be explained further below.

Furthermore, computer system 400 may be connected to a network 480. The network 480 can be connected in various different architectures, for example, client-server architecture, a Peer-to-Peer network architecture, or other type of architectures. For example, network 480 can be in communication with a server 485 that coordinates engines and data used within the screen-tone look application 490. Also, the network can be different types of networks. For example, the network 480 can be the Internet, a Local Area Network or any variations of Local Area Network, a Wide Area Network, a Metropolitan Area Network, an Intranet or Extranet, or a wireless network.

FIG. 4B is a functional block diagram illustrating the computer system 400 hosting the screen-tone look application 490 in accordance with an implementation of the present disclosure. A controller 410 is a programmable processor and controls the operation of the computer system 400 and its components. The controller 410 loads instructions (e.g., in the form of a computer program) from the memory 420 or an embedded controller memory (not shown) and executes these instructions to control the system. In its execution, the controller 410 provides the screen-tone look application 490 with a software system, such as to enable the creation and configuration of engines and data extractors within the screen-tone look application 490. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Storage 430 stores data either temporarily or for long periods of time for use by the other components of the computer system 400. For example, storage 430 stores data used by the screen-tone look application 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user of the computer system 400 and presenting information to the user 402. In one implementation, the user interface 450 includes a keyboard, a mouse, audio speakers, and a display. The controller 410 uses input from the user 402 to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

Figure 5:
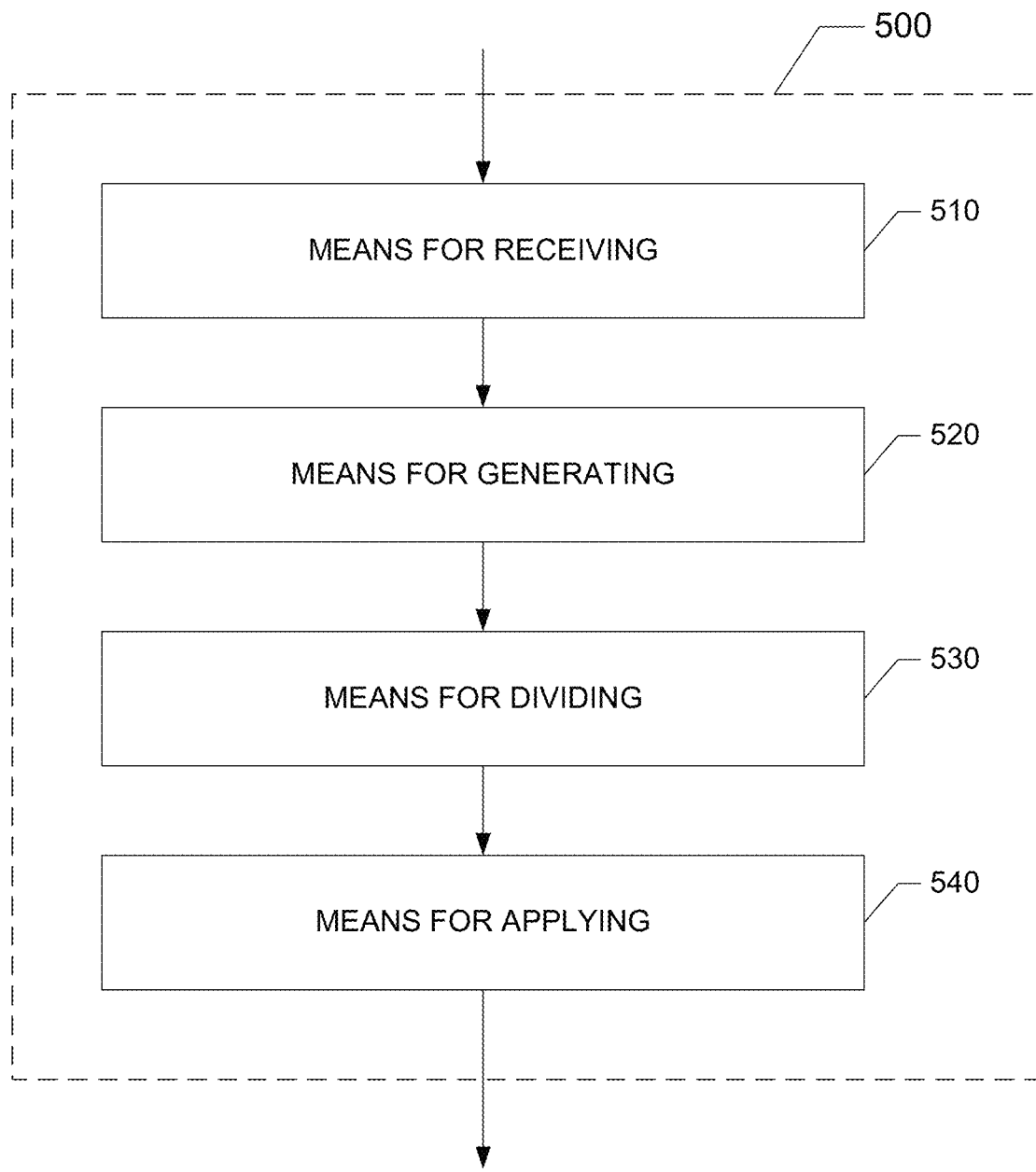
FIG. 5 is a block diagram of an apparatus for generating a screen-tone look image for a video in accordance with one implementation of the present disclosure.

FIG. 5 is a block diagram of an apparatus 500 for generating a screen-tone look image for a video in accordance with one implementation of the present disclosure. In the illustrated implementation of FIG. 5, the apparatus 500 includes means for receiving 510, means for generating 520, means for dividing 530, and means for applying 540.

The means for receiving 510 is configured to receive a smooth gradation rendered image and position information of pixels in the rendered image (e.g., from a renderer). The means for generating 520 is configured to generate a pattern for each pixel of the pixels in the rendered image using the position information. The means for dividing 530 is configured to divide the rendered image into a fixed number of sections defined by luminance to produce a luminance gradient image. The means for applying 540 is configured to apply the patterns to the fixed number of sections of the luminance gradient image.

In one implementation, the screen-tone look generating system 100 is a system configured entirely with hardware including one or more digital signal processors (DSPs), general purpose microprocessors, application specific integrated circuits (ASICs), field programmable gate/logic arrays (FPGAs), or other equivalent integrated or discrete logic circuitry. In another implementation, the screen-tone look generating system 100 is configured with a combination of hardware and software. For example, the hatcher 120 and the thresher 130 are configured with hardware, while the functions of the renderer are configured as software residing within a separate processor.

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. Thus, the present disclosure is not intended to be limited to the implementations shown herein but is to be accorded the widest scope consistent with the principal and novel features disclosed herein.

Various implementations of the present disclosure are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. In addition, the grouping of functions within a module or step is for ease of description. Specific functions can be moved from one module or step to another without departing from the present disclosure.

All features of each above-discussed example are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for generating a screen-tone look image for a character in a video captured by a camera, the method comprising:
    receiving a smooth gradation rendered image and position information of pixels in the rendered image from a renderer;
    generating patterns for the pixels in the rendered image using the position information of the pixels, the generated patterns including dots that run along edges of the character such that the dots get larger as the character comes closer to the camera and the dots get smaller as the character moves away from the camera;
    dividing the rendered image into a fixed number of sections defined by luminance to produce a luminance gradient image, wherein the luminance gradient image includes a series of successive bands which can be manipulated individually; and
    applying the generated patterns to the fixed number of sections of the luminance gradient image.

2. The method of claim 1, wherein the fixed number of sections comprises
    a series of successive bands, wherein each band is manipulated individually.

3. The method of claim 1, further comprising
    providing interactive control over position, width, transition width, transition pattern, and final color correction.

4. The method of claim 1, wherein generating patterns comprises
    generating patterns that simulate printed artifacts including dots, lines, and grid patterns.

5. The method of claim 1, further comprising
    adjusting position, orientation, and frequency of the patterns.

6. The method of claim 1, further comprising
    projecting the patterns onto objects in a scene of the video.

7. The method of claim 1, further comprising
    editing a look of each pattern of the patterns once the patterns are positioned.

8. The method of claim 1, further comprising
    extracting color from the luminance.

9. The method of claim 8, further comprising:
    applying the extracted color to the luminance gradient image; and
    outputting the luminance gradient image as a new color.

10. The method of claim 1, wherein applying the patterns to the fixed number of sections comprises
    applying dots in sections that are relatively bright and applying lines in sections that are relatively shadowy.

11. A screen-tone look generating system for generating a screen-tone look image for a character in a video captured by a camera, comprising:
    a hatcher to receive a smooth gradation rendered image along with position information of each pixel from a renderer, the hatcher configured to use the position information of the pixels to generate patterns for the rendered image, wherein the generated patterns include dots that run along edges of the character such that the dots get larger as the character comes closer to the camera and the dots get smaller as the character moves away from the camera; and
    a thresher to divide the rendered image into a fixed number of sections defined by luminance to produce a luminance gradient image, wherein the luminance gradient image includes a series of successive bands which can be manipulated individually, the thresher configured to apply the generated patterns to the fixed number of sections of the luminance gradient image.

12. The system of claim 11, wherein the patterns simulate printed artifacts.

13. The system of claim 11, wherein the patterns comprise dots, lines, and grids.

14. The system of claim 11, wherein the fixed number of sections comprises a series of successive bands.

15. The system of claim 11, further comprising
a projector configured to project the patterns onto objects in a scene of the video.

16. The system of claim 11, further comprising
an extractor configured to extract color from the luminance.

17. The system of claim 16, further comprising
an applicator configured to apply the extracted color to the luminance gradient image, and output the luminance gradient image as a new color.

18. An apparatus for generating a screen-tone look image for a character in a video captured by a camera, the apparatus comprising:
means for receiving a smooth gradation rendered image and position information of pixels in the rendered image from a renderer;
means for generating patterns for the pixels in the rendered image using the position information of the pixels, the generated patterns including dots that run along edges of the character such that the dots get larger as the character comes closer to the camera and the dots get smaller as the character moves away from the camera;
means for dividing the rendered image into a fixed number of sections defined by luminance to produce a luminance gradient image, wherein the luminance gradient image includes a series of successive bands which can be manipulated individually; and
means for applying the generated patterns to the fixed number of sections of the luminance gradient image.

19. The apparatus of claim 18, further comprising
means for projecting the patterns onto objects in a scene of the video.

20. The apparatus of claim 18, further comprising
means for applying the extracted color to the luminance gradient image, and outputting the luminance gradient image as a new color.

* * * * *